Jan. 6, 1959 F. E. EYSTER 2,867,179
MACHINE FOR TWISTING AND PANNING BREAD DOUGH
Filed May 9, 1956 4 Sheets-Sheet 1
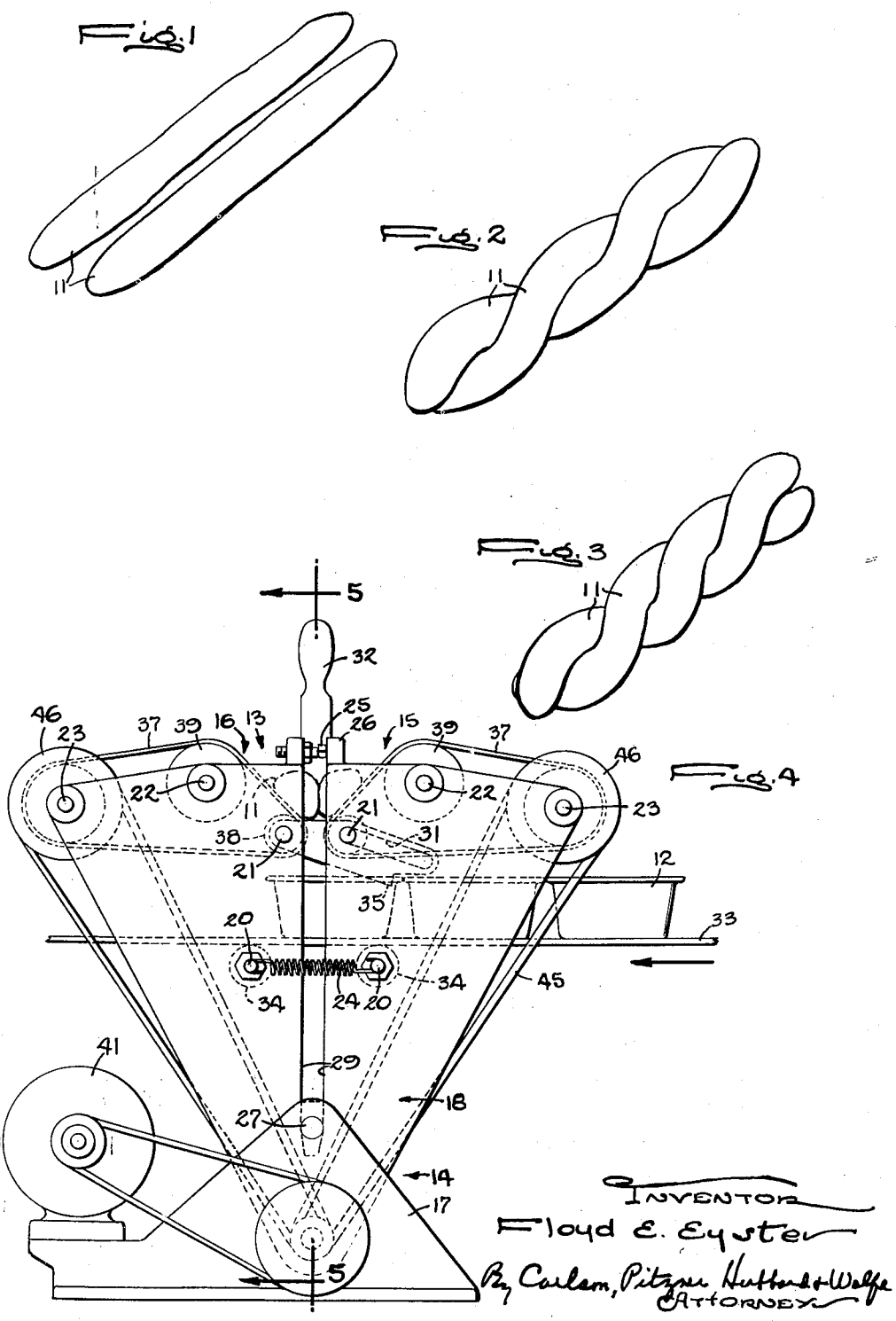

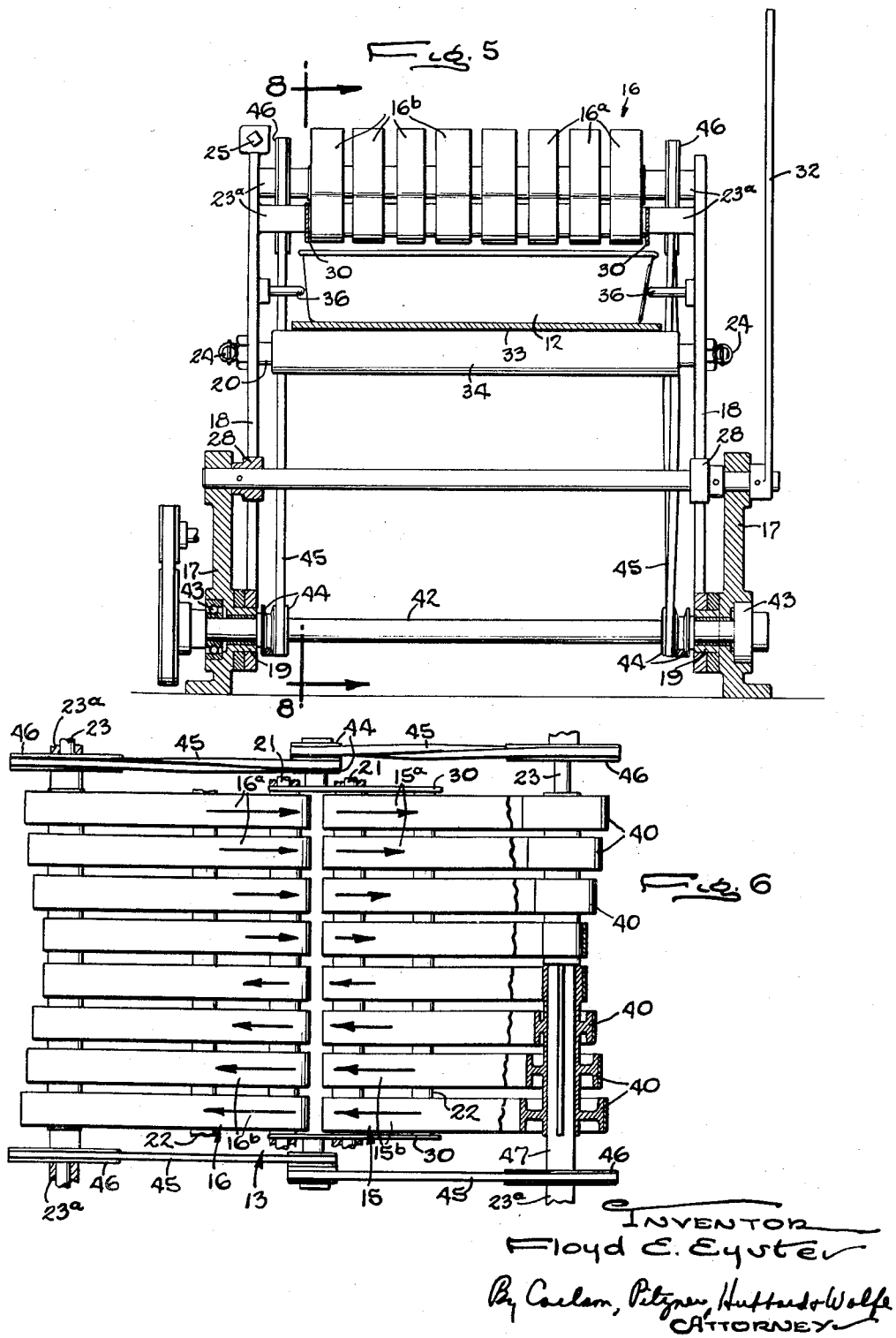

Jan. 6, 1959 F. E. EYSTER 2,867,179
MACHINE FOR TWISTING AND PANNING BREAD DOUGH
Filed May 9, 1956 4 Sheets-Sheet 3

INVENTOR
Floyd E. Eyster

Jan. 6, 1959 F. E. EYSTER 2,867,179
MACHINE FOR TWISTING AND PANNING BREAD DOUGH
Filed May 9, 1956 4 Sheets-Sheet 4
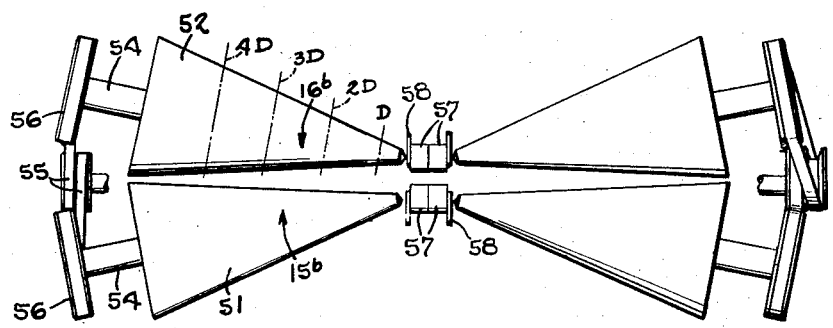
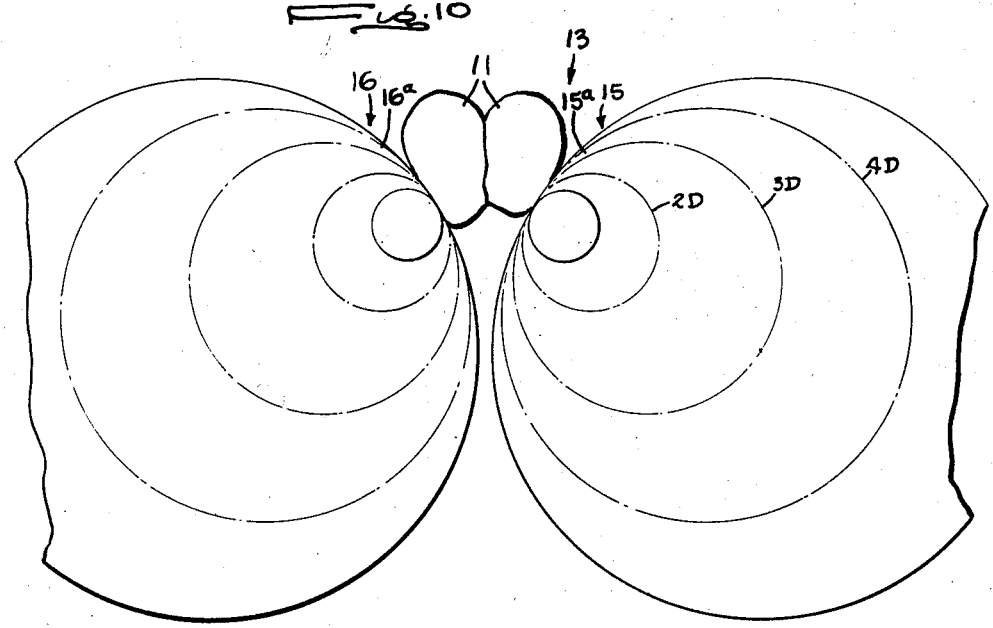
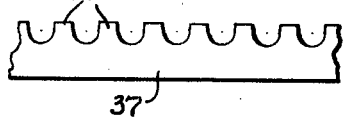
INVENTOR
Floyd E. Eyster
By Carlson, Pitzner, Hubbard & Wolfe
ATTORNEY

United States Patent Office 2,867,179
Patented Jan. 6, 1959

2,867,179

MACHINE FOR TWISTING AND PANNING BREAD DOUGH

Floyd E. Eyster, Rockford, Ill.

Application May 9, 1956, Serial No. 583,739

16 Claims. (Cl. 107—8)

This invention relates to the twisting of two elongated pieces of bread dough together as is common in present bakery practice for the purpose of elongating the air cells and thereby improving the cross-sectional texture of the baked loaf.

The primary object is to provide a machine for automatically twisting the pieces of dough and depositing the twisted loaf in the pan in which it is to be baked.

Another object is to effect the twisting through the use of two surfaces inclined downwardly toward each other and traveling transversely of the line of convergence at speeds which increase progressively along such line and toward opposite ends thereof.

A further object is to mount the traveling surfaces for separation from each other to enable the twisted loaf to be delivered quickly into a baking pan.

Still another object is to form the differently traveling surfaces from endless belts which are mounted in a novel manner to avoid substantial loss of the twist during delivery of the loaf to the bread pan.

The invention also resides in the novel construction and mounting of the traveling surfaces to facilitate controlling the amount of the twist and to provide for uniformity of the twist throughout the length of the loaf.

Other objects and advantages of the invention will become apparent from the following detailed description taken in connection with the accompanying drawings, in which—

Figure 1 is a perspective view of a pair of elongated strips of dough to be twisted in a machine embodying the novel features of the present invention.

Figs. 2 and 3 are views similar to Fig. 1 showing the dough strips after being twisted different amounts.

Fig. 4 is an end elevational view of a preferred form of twisting machine showing the parts in closed positions.

Fig. 5 is a sectional view taken along the line 5—5 of Fig. 4.

Fig. 6 is a fragmentary plan view of the machine.

Fig. 9 is a plan view of a modified construction.

Fig. 10 is a diagrammatic end view of two of the conical members defining one end of the trough in the modification of Fig. 9.

Fig. 11 is a fragmentary side elevational view of a modified form of belt.

Figure 7:
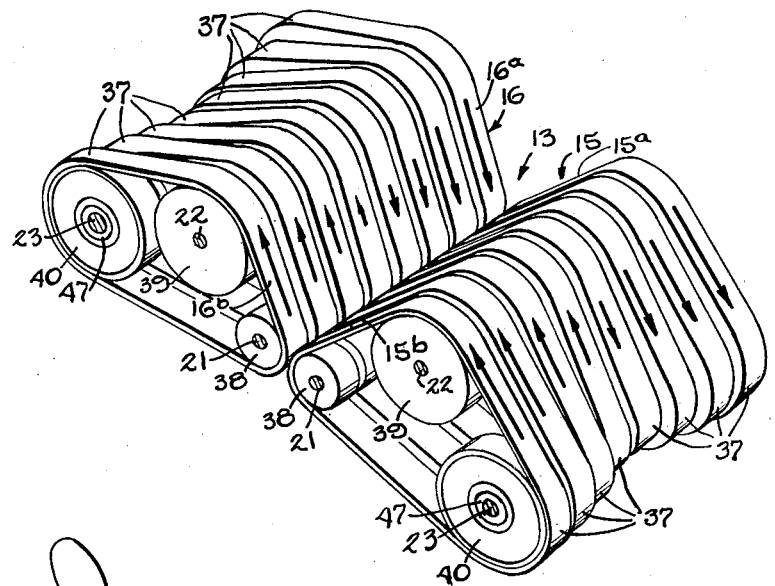
Fig. 7 is a perspective view of the belts forming the trough.

The machine shown in the drawings to illustrate the present invention is especially adapted for twisting together two pieces 11 of bread dough which have previously been rolled into straight elongated strips of approximately the same length and thickness as shown in Fig. 1. After the twisting operation in which the end portions of the strips are displaced angularly relative to each other through one or more revolutions in opposite directions as shown in Figs. 2 and 3, the strips are placed in elongated rectangular pans 12 in which they are baked to form a loaf. The purpose of the twisting is to elongate the air cells in the dough and thereby improve the texture of the finished loaf.

Generally stated, the improved machine comprises an elongated horizontally disposed trough 13 supported on a frame 14 and defined by opposed walls 15 and 16 which diverge upwardly away from adjacent edges which are spaced apart horizontally a distance less than the thickness of the strips of dough so as to receive and support the latter in side-by-side relation. Each wall is divided into sections spaced apart longitudinally of the trough and movable transversely of the longitudinal axis thereof. To effect the twisting operation, the dough engaging surfaces of the opposed sections 15ᵃ and 16ᵃ defining one end portion of the trough are moved transversely of the trough in one direction and the dough engaging surfaces of the other opposed sections 15ᵇ and 16ᵇ are moved transversely of the trough in the opposite direction.

In accordance with one aspect of the present invention, the walls 15 and 16 of the trough 13 are mounted in a novel manner to enable each pair of twisted strips 11 to be deposited quickly and easily into the pan 12 in which the pair is to be baked. To this end, the walls are supported for relative movement horizontally toward and away from each other between closed positions in which the spacing of the walls is less than the thickness of the strips as shown in Fig. 4 and separated positions in which the walls are spaced apart as shown in Fig. 7 a distance greater than the thickness of the twisted loaf thereby permitting the latter to gravitate downwardly through the bottom of the trough. Pans 12 for receiving the falling pairs of strips are supported beneath and closely adjacent the trough bottom and open upwardly toward the latter with their axes extending lengthwise of the trough.

To obtain the relative separating and closing movements of the trough walls 15 and 16, the frame 14 in this instance is divided into two upstanding parts which, adjacent their upper ends, support the respective walls and, at their lower ends, are mounted on a stationary two part base 17 for horizontal swinging of the walls back and forth in arcuate paths. Each frame part comprises a pair of parallel triangular plates 18 journaled at their lower ends on axially alined hollow bosses 19 on the base and connected for swinging in unison about the bosses by a bolt 20 spanning the plates intermediate their ends and three horizontally spaced parallel shafts 21, 22 and 23 spanning the plates adjacent their upper ends and supported in bosses 23ᵃ on the inner sides of the plates.

Figure 8:
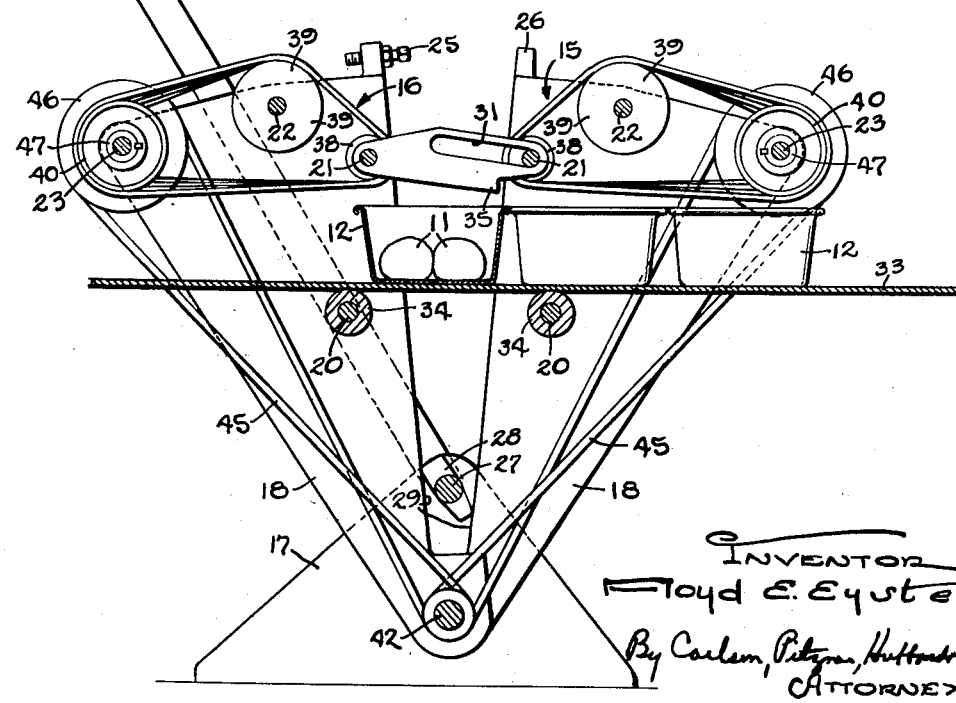
Fig. 8 is a sectional view taken along the line 8—8 of Fig. 5 and showing the parts in their discharge positions.

Normally, the two parts of the frame 14 are urged inwardly toward their closed positions by contractile springs 24 stretched between the plates 18 of the respective parts, such inward movement being limited by abutment between a bolt 25 threaded into a plate of one part and a fixed lug 26 on a plate of the other part. Separation of the parts against the action of the springs is effected by turning a shaft 27 journaled on and spanning the base parts 17 above the frame pivots 19 and carrying cams 28 in the form of radially disposed lugs which are disposed between opposed vertical follower surfaces 29 on the respective plates 18. The lugs are disposed vertically as shown in Figs. 4 and 5 in the closed positions of the plates and turn with the shaft to cam the plates apart as shown in Fig. 8. To limit the separating movement, flat links 30 pivoted on the inner shaft 21 of one frame part are slotted at 31 to receive the corresponding shaft 21 of the other frame part. While the cam shaft 27 may be oscillated automatically in timed relation to delivery to the trough 13 of strips 11 to be twisted, it is turned in this instance by manually swinging a handle 32 rigid with and upstanding from an end portion of the shaft projecting beyond the adjacent base part 17.

Pans 12 for receiving the twisted strips 11 which gravitate through the bottom of the trough 13 are supported in this instance on the upper side of a conveyor belt 33 extending transversely of the trough and horizontally between the plates 18 of each frame part and riding on rollers 34 which are journaled on the bolts 20 spanning the plates. The belt supports a series of the pans and is advanced continuously and in one direction across the bottom of the trough by suitable power drive mechanism (not shown) to carry the pans one by one to a panning position beneath the trough. Lugs or stops 35 depending from the links 30 engage a leading surface of the leading pan in the series to hold the same in the panning position when the trough walls 15 and 16 are closed. To release the leading pan as an incident to separation of the trough walls, the slots 31 in the links are inclined so that the links are lifted to raise the lugs 35 above the upper edges of the pans when the frame parts are separated as shown in Fig. 8 and are lowered to position the lugs in the path of the pans as shown in Fig. 4 when the frame parts are closed. Suitable guides 36 (Fig. 5) project inwardly from the frame plates 18 to engage opposite ends of the successive pans and center the same longitudinally of the trough.

To avoid untwisting of the strips 11 during the panning operation and minimize objectionable compression of the dough due to impact with the pans 12, the differently moving sections 15$^a$, 15$^b$, 16$^a$ and 16$^b$ of the trough walls 15 and 16 preferably are formed by a plurality of endless flexible belts 37. Not only may the latter be supported to provide clearance for placement of the pans 12 close to the bottom of the trough to reduce the distance of gravitation of the twisted strips, but also, they may be moved about parallel axes adjacent the bottom of the trough and lie flush with each other in common planes to provide flat trough walls. Herein, four belts defining four sections for each end portion of the trough walls are supported in parallel planes extending transversely of the trough and spaced apart longitudinally thereof with each belt of one wall lying in the same transverse plane as the opposing belt of the other wall.

The support for each belt comprises three pulleys or roller elements 38, 39 and 40 carried by the respective shafts 21, 22 and 23 on the associated part of the frame 14. The upwardly inclined trough sections of each wall are defined by the portions of the belts extending between the pulleys 38 on the inner shaft 21 and the pulleys 39 on the next adjacent or intermediate shaft 22 which is spaced upwardly and outwardly from the inner shaft, the pulleys on each shaft being of the same diameter so that these portions of the belts lie flush with each other in a common plane. To provide clearance for movement of the pans beneath the belts and closely adjacent the bottom of the trough, the inner pulleys 38 are of small diameter and the lower runs of the belts between these pulleys and the third or outer pulleys 40 extend in a generally horizontal direction away from the undersides of the inner pulleys.

Movement of the belts 37 at opposite end portions of the trough 13 in opposite directions is effected herein by an electric motor 41 mounted on one of the base parts 17 and coupled to a shaft 42 journaled in bearings 43 on the base and extending between the latter and through the hollow pivots 19 supporting the frame plates 18. Pulleys 44 fast on opposite end portions of this shaft are coupled by belts 45 to pulleys 46 on hollow drive shafts or sleeves 47 which are journaled on the outer pulley shafts 23 and each of which supports and is keyed to four of the outer pulleys 40 for the belts 37 of one end portion of the trough. The drive belts 45 at one end portion of the trough, at the right in Fig. 5 and at the top in Fig. 6, are crossed and the drive belts at the other end portion are uncrossed for rotation of the sleeves on each outer shaft in opposite directions and movement of the trough belts 37 at each end portion of the trough transversely of the latter in the same direction which is opposite to that of the belts at the other end portion of the trough as indicated by the arrows in Fig. 6.

In accordance with another aspect of the present invention, the belts 37 are moved transversely of the trough at different speeds to impart approximately the same pitch to different longitudinal sections of each pair of strips 11 and thereby obtain substantial uniformity in elongation of the air cells throughout the length of the strips. To this end, the belts of each end portion of each of the trough walls 15 and 16 are advanced at speeds which increase progressively from the longitudinal center of the wall to the corresponding end thereof, each belt of each trough wall traveling at the same speed as well as in the same direction as the opposing belt of the other wall. With this arrangement, the longitudinal section of the strips 11 engaged by each belt is twisted the same amount as the section engaged by the next adjacent belt nearer the longitudinal center of the strips plus an additional amount which varies with the difference in the speeds of the two belts. Thus, by proportioning the relative speeds of the belts to their spacing from the trough center, the amount of twist or pitch of the adjacent strip sections will be approximately the same.

The rate of twist is selected in accordance with the consistency of the dough to be twisted and, if there were no slippage between the dough and the belts 37, would be determined by the difference in linear speeds of the oppositely moving inner belts of each trough wall and their spacing from the longitudinal center of the trough. However, due to the fact that each belt presents a flat surface which may engage the strips at different distances from the trough center at different times during a twisting operation and because the dough tends to be tough and resilient so as to resist twisting, some slippage occurs between the dough strips and the belts. For this reason, the desired speed relation of the belts set forth above may be approximated while still achieving substantial uniformity of twist throughout the lengths of the strips. In selecting the relative speeds, the spacing of the belts longitudinally of the trough is taken approximately as the spacing of their transverse centers.

In some cases such as where the dough to be twisted is of unusual toughness and resilience, slippage between the dough and the belts 37 may be reduced by forming teeth 37$^a$ on the dough engaging surface of each belt as shown in Fig. 11. Such teeth extend transversely across the belt and, if desired, may be crowned along the transverse center line of the belt.

To enable the belts 37 to travel transversely of the trough 13 at different speeds, the inner and intermediate pulleys 38 and 39 constitute idler pulleys which are freely rotatable on their supporting shafts 21 and 22. With the outer or drive pulleys 40 fast on the respective sleeves 47, the different linear speeds of the belts are obtained simply by varying the diameters of these pulleys, the pulleys on each sleeve decreasing progressively in diameter from the outermost pulley to the innermost pulley adjacent the trough center as shown in Fig. 6. The diameter of the innermost pulley 40 on each sleeve 47 is selected in accordance with the angular speed of the sleeve to advance the corresponding belt at a linear speed correlated with that of the adjacent oppositely moving inner belt to provide the desired rate of twist.

In the operation of the preferred twisting apparatus of Figs. 4 to 8, let it be assumed that the trough walls 15 and 16 are closed as shown in Figs. 4, 5 and 6 and that the motor 41 is energized for advancing the belts 37 at opposite end portions of the trough 13 in opposite directions transversely of the trough as indicated by the arrows in Fig. 6. The frame parts being closed, the locating lugs 35 on the links 30 are disposed in their lower positions of engagement with a leading surface of the leading pan 12 on the conveyor 33 to locate the pan beneath the bottom of the trough. Herein, this surface is the inner side of the upper edge portion of the trailing wall of the pan and the transverse center of the latter is offset rearwardly along the conveyor a slight distance from the bottom of the trough.

When two strips 11 of dough to be twisted are laid lengthwise in the trough 13, different longitudinal sections of the strips are engaged by the respective belts 37 and tend to travel transversely of the trough therewith. Since the belts on opposite end portions of the trough advance in opposite directions, the end portions of the strips are twisted in opposite directions. Such twisting occurs substantially throughout the lengths of the strips and at a uniform rate because each belt and therefore the portion of the strips engaged thereby travels transversely of the trough at a faster rate than the speed of the next adjacent belt and strip portion nearer the center of the trough. With the speeds of the belts correlated with their spacing from the trough center, each longitudinal section of the dough strips is twisted approximately the same amount as the next adjacent section nearer the centers of the strips plus an additional amount corresponding to the difference in spacing of the sections from the strip centers.

The number of twists placed in each pair of dough strips 11 depends on the length of time the strips are left in engagement with the traveling belts 37. For example, the strips as shown in Fig. 2 were left in such engagement long enough for angular displacement of their opposite end portions through approximately one revolution relative to each other. By leaving the strips on the belts a longer time, the end portions may be displaced through approximately one and one-half revolutions as shown in Fig. 3.

When the desired number of twists has been placed in the dough strips 11, the latter are discharged from the trough 13 and panned automatically by separating the trough walls 15 and 16. This is accomplished simply by swinging the handle 32 about the axis of the shaft 27 to turn the cams 28 and swing the frame parts horizontally away from each other about their pivots 19. As an incident to such swinging, the lugs 35 advance along the conveyor to permit the leading pan 12 to center itself with respect to the trough walls 15 and 16. When the walls are spaced apart a distance greater than the thickness of the twisted strips, the latter gravitate into the leading pan. Due to location of the pan close to the bottom of the trough as permitted by the small size of the inner idler rollers 38 and disposal of the lower runs of the belts 37 generally horizontally, the twisted strips fall through only a short distance so as to avoid loss of their twist.

After the twisted strips 11 are panned, the trough walls 15 and 16 are separated farther a short distance for camming of the links 30 upwardly far enough to raise lugs 35 above the upper edges of the filled pan 12 and release the latter for advance with the conveyor away from the trough. As soon as the filled pan is released, the handle 32 is permitted to swing backwardly under the action of the springs 24 for closure of the trough and lowering of the lugs 35 below the upper edges of the pans for engagement with the trailing wall of the then leading pan. This places the apparatus in readiness to receive another pair of strips to be twisted.

Progressive increase of the speeds of the points of engagement of the trough walls 15 and 16 with the dough strips 11 from the center to the ends of the trough for uniform twisting of the strips also may be obtained where each end portion of the trough walls is defined by a single member rather than a plurality of members like the belts 37 of the preferred construction of Figs. 4 to 8. A modified construction of this character is shown in Figs. 9 and 10 in which parts corresponding to parts of the preferred construction bear the same reference characters. In the modified construction, the trough wall sections 15ª, 15ᵇ, 16ª and 16ᵇ are defined by four members 50, 51, 52 and 53 shaped as similar frustums of cones and arranged in two pairs at opposite end portions of the trough. The members of each pair taper toward the center of the trough and are fast on shafts 54 supported on a suitable frame (not shown) similar to the frame 14 for rotation of the members about their own axes which are disposed generally horizontally but coverge upwardly and inwardly toward each other to position opposed portions of the members at the bottom of the trough substantially in a horizontal plane and in parallelism with each other. Like the groups of belts 37 at each end portion of the trough, the horizontal spacing of opposed portions of each pair of members is less than the width of the strips 11 to be twisted with such opposed portions forming the upwardly diverging walls of the trough. The smaller ends of the conical members of each trough wall, although disposed closely adjacent the center of the trough for contact with the dough strips substantially throughout the lengths of the strips, are spaced apart in this instance to receive two idler rollers 57 engageable with the center portions of the strips being twisted. The rollers are supported on rigid frame brackets 58 with their inner surfaces flush with the inner surfaces of the members at the bottom of the trough and are freely rotatable about an axis paralleling the longitudinal center line of the trough.

Rotation of the conical members 50, 51, 52 and 53 at each end portion of the trough 13 in the same direction opposite to that of the members at the other end portion but at the same angular velocities is effected through suitable power drive mechanism (not shown) for advancing belts 55 which extend around pulleys 56 fast on the shafts 54 of the members, the dough engaging surfaces of the members at opposite ends of the trough moving in opposite directions the same as the belts 37. Due to their conical shape and their taper toward the center of the trough, the dough engaging surfaces of the members travel transversely of the trough at speeds which increase progressively from the center to the ends of the trough. To obtain the desired uniformity of twist of different longitudinal sections of the strips, the dough engaging surfaces of the members are tapered for movement of each point thereof at a speed faster than that of any other point nearer the trough center by an amount proportional to the spacing of the points from the center the same as in the case of the belts 37. With such taper, the diameter of a point, for example, that indicated by a line 2D in Fig. 9, is twice as large as the diameter of a point D spaced half as far from the trough center as the point 2D. Similarly, the diameters of other points 3D and 4D spaced respectively three and four times as far from the center as the inner point D are three and four times as large as the diameter of the inner point D.

It will be apparent from the foregoing that in both forms of the invention, the twist of the strips 11 is distributed substantially uniformly throughout their lengths. This is accomplished not only by disposing the belts 37 and the conical members 50, 51, 52 and 53 closely adjacent the center of the trough 13, but also, by advancing the dough engaging surfaces at speeds which increase progressively from the center to the ends of the trough. With the pans 12 supported directly beneath the trough and with the walls 15 and 16 of the latter movable horizontally toward and away from each other, the twisted strips are discharged easily from the trough without being touched by the operator and are panned automatically as an incident to such discharge. The possibilities of untwisting of the strips and damage thereto during the discharge and panning operations is reduced by utilizing the belts 37 to form the trough and extending the same around the pulleys 38 of small diameter at the bottom of the trough to permit the pans 12 to be supported closely adjacent the bottom.

I claim as my invention:

1. In a dough twisting machine, the combination of, a frame, a first set of endless belts disposed in spaced parallel planes and defining one of two opposed upwardly diverging walls of a horizontally disposed trough extending transversely of the planes, a second set of endless belts defining the other of said walls and disposed in planes parallel to said planes of said first set, a plurality of pulleys supporting said belts for movement transversely of said trough and comprising a drive pulley and first and second idler pulleys for each belt, means on said frame mounting said first idler pulleys for each of said belt sets adjacent the bottom of said trough for individual rotation about an axis paralleling the axis of the idler pulleys of the other belt set, said second pulleys on the frame adjacent the upper edges of said trough walls for rotation individually about axes paralleling and spaced outwardly from the first pulley axes, and said drive pulleys for rotation about axes paralleling and spaced outwardly from said first idler axes, means connecting the ones of said drive pulleys at each end portion of each of said trough walls for rotation in unison, and drive means on said frame connected to said drive pulleys and operable to rotate the latter for advance of said belts at one end portion of said trough in one direction transversely of the trough and the belts at the other end portion in the opposite direction, the diameters of said drive pulleys increasing progressively from the center to the ends of said trough.

2. In a dough twisting machine, the combination of, a frame, an elongated trough having opposed walls diverging upwardly and away from each other with each wall defined by a plurality of endless belts spaced apart longitudinally of the trough and each belt extending transversely of the trough and around an idler pulley and a drive pulley, a shaft mounted on said frame and supporting said idler pulleys of each wall for rotation individually about a common axis paralleling the axis of the idler pulleys of the other wall, two drive shafts for said belts of each of said walls journaled on said frame for rotation relative to each other about a common axis parallel to said idler axes and respectively carrying the drive pulleys on opposite sides of the longitudinal center of the trough, and means on said frame coupled to said drive shafts and operable to rotate the two drive shafts for both of said walls on one side of said trough center in one direction and the other drive shafts on the opposite side of the center in the opposite direction, said drive pulleys on each of said drive shafts increasing progressively in diameter from the center to the adjacent end of said trough to increase the speeds of the associated belts correspondingly.

3. In a dough twisting machine, the combination of, an elongated trough having opposed walls diverging upwardly and away from each other, each of said walls being defined by a plurality of endless belts spaced apart longitudinally of said trough and extending transversely of the trough, means supporting those of said belts at one end portion of said trough and advancing the same in one direction transversely of the trough and at speeds increasing progressively from the center to the end of the trough, and means supporting those of said belts at the other end of said trough for movement transversely of the trough in the opposite direction and at speeds increasing progressively from the center to the end of the trough.

4. In a dough twisting machine, the combination of, two pairs of frusto conical members defining opposite end portions of an elongated upwardly opening trough for receiving strips of dough to be twisted, said members of each pair tapering inwardly toward the center of the trough and the other pair and spaced apart horizontally a distance less than the thickness of the dough strips, means rotatably supporting said members of each pair with their axes inclined upwardly and converging inwardly toward each other and their opposed dough engaging surfaces substantially paralleling each other, and means connected to said members for rotating the pair of members at one end of said trough to move the dough engaging surfaces thereof in one direction transversely of the trough and the other pairs of members to move their dough engaging surfaces in the opposite direction transversely of the trough.

5. In a machine for twisting two elongated strips of dough together, the combination of, a frame, an elongated trough supported on said frame and having two walls diverging upwardly away from each other and each comprising sections disposed adjacent and on opposite sides of the longitudinal center of the trough to engage and support strips to be twisted at points distributed throughout the lengths of the strips, and means on said frame mounting said sections for movement along inclined paths transverse to the trough and advancing the sections of both of said walls on one side of said center in one direction transversely of the trough and the other sections on the other side of the center in the opposite direction, each of said points of engagement on each of said sections having a speed correlated with and greater than the speed of the point nearest said center by an amount proportional to the approximate spacing of the points from the center.

6. In a machine for twisting two elongated strips of dough together, the combination of, an elongated trough having only two opposed walls diverging upwardly away from their lower edges which define the bottom of the trough and are spaced apart transversely of the latter a distance less than the thickness of said strips, said walls each comprising sections disposed closely adjacent and on opposite sides of the longitudinal center of the trough and at points along the length thereof to engage and support strips to be twisted throughout substantially the entire lengths of the strips, and means mounting said sections for movement along inclined paths transverse to the trough and advancing the sections of both of said walls on one side of said center in one direction transversely of the trough and the sections on the other side of the center in the opposite direction with each section at each of said points of engagement having a speed correlated with and greater than the speed of the next adjacent point nearer the trough center to impart a uniform twist to the strips at substantially all points along their lengths.

7. In a dough twisting machine, the combination of, two opposite side walls converging downwardly toward each other and defining an upwardly opening trough adapted to receive and support two elongated pieces of dough in side-by-side relation, the lower edges of said walls being disposed closer together than the thickness of the pieces of dough to be twisted to define the bottom of the trough and each of said walls comprising a plurality of surfaces distributed substantially throughout the length of the trough and movable transversely of the trough at speeds which increase progressively toward opposite ends of the trough, and means operable to drive the surfaces at opposite end portions of the trough in opposite directions and thereby correspondingly twist the dough pieces together throughout their lengths.

8. A dough twisting machine as defined by claim 7 having means supporting said trough walls for movement toward and away from each other.

9. A dough twisting machine as defined by claim 7 in which said surfaces of the trough walls are formed by separate sets of endless flexible belts.

10. A dough twisting machine as defined by claim 7 in which said surfaces of the trough walls are formed by separate sets of endless flexible belts movable about spaced parallel axes disposed adjacent the bottom of the trough.

11. A dough twisting machine as defined by claim 7 in which said surfaces of each of the trough walls are formed on a pair of rigid members of conical shape tapering toward each other from the ends of the trough.

12. In a dough twisting machine, the combination of, an elongated trough having opposed walls diverging upwardly and away from each other, each of said walls being defined by a set of endless belts spaced apart longitudinally of said trough and extending transversely thereof, two frame members one for each of said belt sets, a plurality of pulleys arranged in two sets one for each of said belt sets and each including idler pulleys mounted on the associated frame member adjacent the bottom of said trough for individual rotation about an axis paralleling the axis of the pulleys of the other set, the undersides of said belts of each of said sets extending horizontally from the associated pulleys and away from the bottom of said trough, means disposed beneath said trough for supporting a pan with its upper edges closely adjacent said undersides of said belts, and means supporting said frame members for relative movement of said belt sets horizontally away from each other to open said trough for gravitation of dough therefrom into the pan on said supporting means.

13. In a dough twisting machine, the combination of, a plurality of endless belts lying in spaced parallel planes and arranged in two sets, the belts of each of said sets defining a different one of two opposed upwardly diverging walls of an elongated horizontally disposed trough extending transversely of the planes, two frame members one supporting the belts of each of said sets for movement transversely of said trough, means on said frame members connected to said belts and operable to advance the belts at one end portion of said trough in one direction transversely of the trough and the belts at the other end of said trough in the opposite direction, means supporting said members for relative movement horizontally away from each other to separate said sets of belts and open the bottom of said trough for gravitation of twisted dough strips therefrom, and means disposed beneath said trough for receiving and supporting the gravitating twisted strips.

14. In a machine for twisting two elongated strips of dough together, the combination of, an elongated trough having opposed walls diverging upwardly away from the bottom of the trough to receive and support said strips and each formed in sections disposed on opposite sides of the longitudinal center of the trough, a frame having two members one supporting each of said walls for movement of said sections thereof along paths inclined upwardly from said trough bottom and extending transversely of the trough, means connected to the respective wall sections and operable to move the sections at one end portion of the trough along said paths in one direction transversely of the trough and the sections at the other end portion in the opposite direction, a conveyor extending horizontally beneath the bottom of said trough and movable transversely of the trough in one direction to carry a plurality of pans one by one to a panning position beneath the trough, means supporting said members for relative movement of said walls horizontally away from and toward each other to open said trough for gravitation of twisted strips from said trough into a pan in said position and to close the trough, and a stop mounted on one of said frame members and movable into and out of the path of pans on said conveyor as an incident to movement of the members respectively toward and away from each other.

15. In a machine for twisting two elongated strips of dough together, the combination of, an elongated trough having opposed walls diverging upwardly away from the bottom of the trough to receive and support said strips and each formed in sections disposed on opposite sides of the longitudinal center of the trough, a frame having two members one supporting each of said walls for movement of said sections thereof along paths inclined upwardly from said trough bottom and extending transversely of the trough, means connected to the respective wall sections and operable to move the sections at one end portion of the trough along said paths in one direction transversely of the trough and the sections at the other end portion in the opposite direction, a conveyor extending horizontally beneath the bottom of said trough and movable transversely thereof to support a plurality of upwardly opening pans for movement one by one to a panning position beneath the trough, and means mounting said frame members for relative movement of said walls horizontally away from each other to open said trough for gravitation of twisted strips into a pan in said panning position.

16. In a machine for twisting two elongated strips of dough together, the combination of, an elongated trough having opposed walls diverging upwardly away from the bottom of the trough to receive and support said strips and each formed in sections disposed on opposite sides of the longitudinal center of the trough, a frame having two members one supporting each of said walls for movement of said sections thereof along said paths inclined upwardly from said trough bottom and extending transversely of the trough, means connected to the respective wall sections and operable to move the sections at one end portion of the trough along said paths in one direction transversely of the trough and the sections at the other end portion in the opposite direction, means extending along and disposed beneath the bottom of said trough for receiving and supporting twisted strips of dough, and means mounting said members for relative movement of said walls horizontally away from and toward each other to open said trough at the bottom for gravitation of twisted strips onto said supporting means and to close the trough to receive new strips to be twisted.

References Cited in the file of this patent

UNITED STATES PATENTS

| | | |
|---|---|---|
| 1,906,847 | Fitzgerald | May 2, 1933 |
| 2,080,584 | Streich | May 18, 1937 |
| 2,090,379 | Streich | Aug. 17, 1937 |